United States Patent
Heilmann

(10) Patent No.: US 11,879,079 B2
(45) Date of Patent: Jan. 23, 2024

(54) FILM ADHESIVE AND METHOD FOR PRODUCING SAME

(71) Applicant: DEUTSCHES ZENTRUM FÜR LUFT-UND RAUMFAHRT E.V., Cologne (DE)

(72) Inventor: Lennert Heilmann, Bremen (DE)

(73) Assignee: DEUTSCHES ZENTRUM FUR LUFT—UND RAUMGAHRT E.V., Cologne (DE)

( * ) Notice: Subject to any disclaimer, the term of this patent is extended or adjusted under 35 U.S.C. 154(b) by 912 days.

(21) Appl. No.: 16/624,089

(22) PCT Filed: Jun. 19, 2018

(86) PCT No.: PCT/EP2018/066227
§ 371 (c)(1),
(2) Date: Dec. 18, 2019

(87) PCT Pub. No.: WO2018/234298
PCT Pub. Date: Dec. 27, 2018

(65) Prior Publication Data
US 2020/0148917 A1 May 14, 2020

(30) Foreign Application Priority Data
Jun. 19, 2017 (DE) ...................... 10 2017 113 432.8

(51) Int. Cl.
*C09J 7/21* (2018.01)
*C09J 7/02* (2006.01)
*C09J 5/06* (2006.01)

(52) U.S. Cl.
CPC . *C09J 7/02* (2013.01); *C09J 5/06* (2013.01); *C09J 2301/416* (2020.08); *C09J 2400/263* (2013.01)

(58) Field of Classification Search
CPC . C09J 7/21; C09J 5/06; C09J 2301/416; C09J 2400/263; C09J 2301/16
See application file for complete search history.

(56) References Cited

U.S. PATENT DOCUMENTS

| | | | |
|---|---|---|---|
| 2004/0142143 A1* | 7/2004 | Corden | B29C 70/541 428/104 |
| 2013/0101805 A1* | 4/2013 | Altshuler | B32B 3/266 264/109 |
| 2015/0147536 A1* | 5/2015 | Lungershausen | B32B 27/12 428/189 |

FOREIGN PATENT DOCUMENTS

| | | |
|---|---|---|
| DE | 101 12 375 A1 | 9/2002 |
| DE | 10 2004 012 442 C5 | 1/2012 |

(Continued)

*Primary Examiner* — Daniel H Lee
(74) *Attorney, Agent, or Firm* — WCF IP

(57) ABSTRACT

The invention relates to a film adhesive for bonding at least two joint partners, containing an adhesive for an adhesive connection of the joint partners and a flat textile support material. The adhesive is applied onto the flat textile support material in the form of a film, and the flat textile support material has at least one first section which adjoins at least one second section of the support material. The support material of the first section has a modified material and/or is chemically and/or geometrically modified compared to the support material of the second section such that after curing the adhesive, the adhesive connection has a mechanical property in the region of the first section relating to an elongation at break or fracture toughness which differs from the mechanical property of the adhesive connection in the region of the second section.

8 Claims, 4 Drawing Sheets

(56) References Cited

FOREIGN PATENT DOCUMENTS

Figure 1:
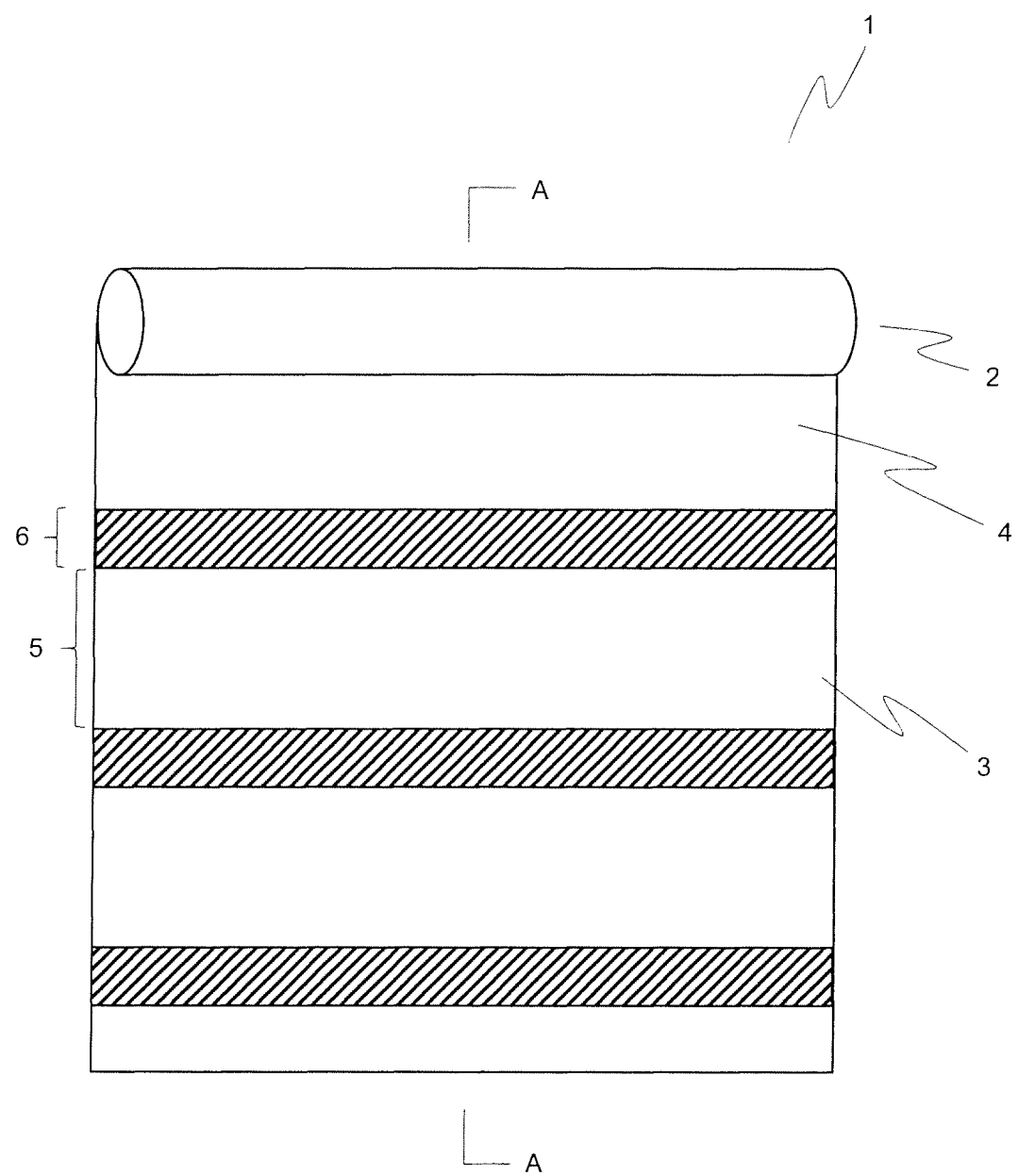

| DE | 10 2013 107 849 A1 | | 1/2015 | |
|----|---|---|---|---|
| EP | 1 381 641 A1 | | 1/2004 | |
| EP | 2 324 979 A1 | | 5/2011 | |
| EP | 2324979 A1 | * | 5/2011 | ............. B29B 11/16 |

* cited by examiner

FILM ADHESIVE AND METHOD FOR PRODUCING SAME

The invention relates to a film adhesive for the substance-to-substance joining of at least two adherends, the film adhesive comprising an adhesive for an adhesive bond of the adherends and comprising a textile planar carrier material bearing the adhesive applied in the manner of a film. The invention also relates to a method for producing a film adhesive of this kind, and to a method for producing an adhesive bond by means of a film adhesive of this kind.

On account of their weight-specific strength and stiffness, it is now virtually impossible not to conceive of fiber composites in the production of any components. These fiber composites consist primarily of two essential constituents—a fiber material and a matrix material—and may optionally include further constituents besides (specific to application). In the production of fiber composite components from a fiber composite, the fiber material is generally brought into the corresponding form of the subsequent component, and then the matrix material infused into the fiber material is cured. Curing is accomplished in the great majority of cases through temperature and optionally pressure exposure. The curing forces the load-bearing fibers of the fiber material into their predefined direction, where together with the cured matrix material they form an integral unit for load dissipation.

Not only in the production of complex fiber composite components is adhesive bonding a joining technique offering particular potential for lightweight construction. Here, by means of an adhesive bond, two components are joined to one another firmly and in general unpartably at their respective joining surfaces, by means of cohesion and/or adhesion; further mechanical fastening elements can be omitted here only when the failure of the adhesive bond produced is not critical to the operation of the respective underlying technical facility. Validating the strength and durability of adhesive bonds that have been produced represents a key problem in adhesive bonding technologies, since wrong or inadequate surface treatments, adhesives processed with overlaying or improperly, and also contaminations may greatly diminish the bond strength. Particularly in the area of air travel, in connection with the production of aircraft, especially from a fiber composite, where structural components are among those produced by adhesive bonds from fiber composite components, it is absolutely vital for the adhesive bond to have strength and durability, since in the event of damage to an adhesive bond of this kind there can no longer be any assurance of safe flying operation.

Thus, in contaminated regions of the adhesive bond, the operating loads may lead to local separation of the join, with subsequent crack propagation throughout the bondline, thereby greatly lowering the load-bearing capacity of the adhesive bond even to the point of the complete failure of the bond.

In air travel, therefore, it is common practice to secure the adhesive bonding at certain intervals by means of additional, mechanical joining elements ("chicken rivets")—this, however, is diametrically opposed to the principle of lightweight construction. The benefit to be achieved through the adhesive bonding, namely a weight reduction in flight operation and consequent savings in fuel and therefore costs, is canceled out again by these additional mechanical joining elements.

Known from DE 10 2013 107 849 A1, then, is a method for producing a fiber composite structure from at least two separately produced fiber composite structural elements which are to be joined to one another by the joining technique of adhesive bonding. This is done using two different adhesive systems, which are introduced into the adhesive bond in such a way that separate adhesive zones arise, composed of the first adhesive system and the second adhesive system. In the solidified state of the second adhesive system, it has a higher fracture toughness than the first adhesive system, so giving the bondline different qualities within the adhesive bond. In regions with a low fracture toughness and a high strength (first adhesive system), cracks which develop are able to propagate only into the regions of the second adhesive zone, where the bondline propagate a high fracture toughness (tough-elastic), but reduced strength and stiffness. In this way, cracks which have developed in the bondline can be effectively confined to a local region.

The disadvantage in this case, however, is that the introduction of two different adhesive systems, each adjoining one another in alternation, is very complicated, leading in turn to relatively long joining times and hence to higher costs. In the production of adhesive bonds of this kind, moreover, it is necessary to operate very carefully when introducing the adhesive, since the different adjoining adhesive systems ought as far as possible to adjoin one another without gaps, in order to prevent load bridges in this region. Furthermore, there is a sharp discontinuity in the elongation at break quality at the edges of the adhesive zones, and this promotes the continuation of cracks along the edges.

It is an object of the present invention, therefore, to provide an improved method with which two components can be joined to one another in an operationally reliable way by means of adhesive bonding, where the adhesive bond to be produced is to have a crack-stopping or crack-inhibiting quality. A further object of the present invention, therefore, is to specify an improved adhesive system, and a method for producing said system, in order to bring about the production of an adhesive bond of the aforesaid kind.

The object is achieved in accordance with the invention by a film adhesive, a method for producing the film adhesive, and a method for producing an adhesive bond.

Claim 1 proposes a film adhesive for adhesive bonding and joining of at least two adherends, the film adhesive comprising an adhesive for an adhesive bond of the adherends and comprising a textile planar carrier material, the textile planar carrier material bearing the adhesive applied in the manner of a film. The textile carrier material bears the applied adhesive more particularly in such a way that the textile planar carrier material is completely covered by the adhesive at least on the flat sides of the textile carrier material which lies opposite the joining faces of the two adherends. In the context of the film adhesive, the function of the textile planar carrier material is, in particular, that of a spacer for a predefined and mandated thickness of the adhesive bond. This adhesive bond is realized exclusively through the adhesive; the textile planar carrier material here specifically does not serve as a connection between the two adherends. The adhesive bond is realized exclusively by way of the adhesive. It is conceivable, for example, for the textile planar carrier material to be completely surrounded by the adhesive and therefore completely impregnated by the adhesive, in which case suitable carrier materials are, in particular, porous materials, such as, for example, fiber materials which are open-pored.

For the processing of the film adhesive it may be an advantage if in the uncured state the textile planar carrier material protrudes at least partly from the adhesive and is therefore not completely preimpregnated. In the uncured state of the adhesive, therefore, the textile planar carrier material is at least partly impregnated in such a way that after the adhesive is cured, the textile planar carrier material is surrounded completely by the cured adhesive.

The adhesive is more particularly an engineering material which is adhesive and which cures, being able to enter into a suitable adhesive bond with the adherends. In particular, only a single adhesive system is used for the film adhesive, and so the entire film adhesive contains only a single adhesive material which is intended to form the subsequent adhesive bond. The adhesive as an engineering material is therefore a homogeneous material or homogeneous engineering material. Unlike the known adhesive tapes, such as adhesive parcel tape, for example, the textile planar carrier material is not an adherend which serves as an auxiliary for the adhesive bonding. With known adhesive tapes, indeed, and especially in the case of a double-sided adhesive tape, an adhesive material is applied to a usually plasticlike adherend, so that the joining of two adherends by means of a double-sided adhesive tape produces an adhesive bond which in and of itself consists of two separate adhesive bonds: firstly, an adhesive bond between the first adherend and the plastics carrier, and secondly an adhesive bond between plastics carrier and the second adherend. In the case of the present invention, conversely, the adhesive bond is realized exclusively through the adhesive, and the textile planar carrier material is not an adherend in the sense of an adhesive tape. Instead, the textile planar carrier material acts as a carrier for the adhesive and spacer for a defined thickness of the adhesive bond.

In accordance with the invention, then, the textile planar carrier material has at least one first section which adjoins at least one second section of the carrier material, the carrier material of the first section being modified materially, chemically and/or geometrically relative to the carrier material of the second section such that after the curing of the adhesive, the adhesive bond in the region of the first section has a mechanical feature, in relation to the elongation at break or fracture toughness, which is different from the mechanical feature of the adhesive bond in the region of the second section, i.e., is either higher or lower.

A film adhesive is therefore proposed in which the intention is to produce an adhesive bond, similarly to DE 10 2013 107 849 A1, which has corresponding crack-stopping qualities, by providing regions having a modified elongation at break and/or fracture toughness, without the requirement that the adhesive per se consist from the outset of two different adhesive systems. It has instead been recognized that the achievement possible by virtue of substantive, chemical and/or geometric modification of the textile carrier material is that a single adhesive system is used, which, however, on curing interacts in sections with the substantive, chemical and/or geometric modification in such a way that the adhesive bond in these modified regions has a higher or lower elongation at break or fracture toughness, allowing the entire adhesive bond overall to be given a crack-stopping quality. Indeed, a crack in the adhesive bond that propagates in one section comes about usually in those regions where the stiffness is high and the elongation at break or fracture toughness is low; any crack developing in this way propagates only up to those adjacent regions or sections in which, while the stiffness or strength of the adhesive bond is reduced, there is nevertheless an increase in the elongation at break or fracture toughness.

It is possible as a result to realize a film adhesive which is very simple to produce, since only a single, homogeneous adhesive is used, and is applied to a carrier material. It is only through the substantive, chemical and/or geometric modification of parts of the carrier material, producing corresponding different sections in the carrier material, that the adhesive is modified on curing to produce the adhesive bond, thereby allowing the realization of adhesive bonds having crack-stopping and crack-inhibiting qualities.

With the innovative film adhesive it is possible to produce an adhesive bond wherein regions with high strength qualities are surrounded by sections with tough-elastic quality. In contrast to the technical teaching of DE 10 2013 107 849 A1, in which the aim is to obtain clearly delimited material qualities in the different regions of adhesive, the modification of the carrier material on curing of the adhesive develops, in the adhesive bond, a gradient in quality between the two first and second sections, thus avoiding, in particular, the continuation of cracks in the edge region. The solution known from the prior art, indeed, exhibits a sharp discontinuity in the elongation at break or fracture toughness quality in the edge region of the different zones of adhesive, whereas in the present invention a fluid transition between regions of low elongation at break or fracture toughness and high strength and regions of high elongation at break or high fracture toughness, and tough-elastic qualities.

The gradient in quality between the two first and second sections, i.e., the gradual transition in the quality in question, ensures the dissipation of load at the crack tip. In chemical reactions between adhesive and the composition applied, the gradient may form in a natural way, for example, by diffusion. In the case of the geometric modification, the transition from the thin region to the thick region may be designed with a corresponding transition. In the case of applied particles, they can be applied, for example, in a defined distribution; accordingly, in the case of a linear application of the particles, for example, there are numerous particles present in the middle of the line, with the quantity or concentration gradually decreasing toward the edge of the line.

As already mentioned, the carrier material of the first section may be modified relative to the carrier material of the second section such that the adhesive bond has a higher elongation at break or a higher fracture toughness after the curing in the region of the first section than the adhesive bond in the region of the second section, with the consequence that a crack or a flaw in the adhesive bond within the second section does not continue beyond the region of the first section of the adhesive bond, since here the adhesive bond has a higher fracture toughness or elongation at break than in the regions of the second section. In this case an adhesive with high strength and low elongation at break or fracture toughness is used, and is modified accordingly in the regions of the first sections, by virtue of the modification, in such a way that regions here with high fracture toughness or elongation at break are formed, which then inhibit or stop the propagation of cracks.

It is of course also conceivable to use an adhesive which in principle has a high elongation at break or fracture toughness, but in which consequently the stiffness or strength of the adhesive is reduced. In that case, the effect of the modification in the regions of the first section is that the stiffness or strength of the adhesive in the regions of the first section is increased, and so the second sections, in this embodiment, then have the crack-inhibiting or crack-stopping capacities.

In one advantageous embodiment, the fracture toughness or elongation at break is altered, by the modification of the carrier material, in such a way that it is at least 20%, preferably at least 50%, higher or lower than in the unmodified sections.

In a further advantageous embodiment, the stiffness or strength is altered, through modification of the carrier material, in such a way that it is at least 20%, preferably at least 50%, higher or lower than in the unmodified sections.

In one advantageous embodiment, the textile planar carrier material has a plurality of first sections each delimited from one another by one of the second sections, so that the first sections each form separate zones which are not joined to one another.

The sections in this case are preferably delimited from one another in such a way that those sections which exhibit the crack-stopping or crack-inhibiting quality separate the other sections from one another such that the other sections are not joined to one another. The reason is that a crack or a flaw in the adhesive bond is always produced in the other regions which do not have any crack-inhibiting or crack-stopping quality, and so the delimitation with the sections which have the crack-inhibiting or crack-stopping quality is intended specifically to prevent propagation of the crack in the entire adhesive bond.

The first sections are therefore preferably arranged on the carrier material in such a way that the first sections and/or second sections form separate zones which inhibit or stop the propagation of cracks in the entire adhesive bond and prevent any such complete propagation.

It is conceivable, for instance, for the first sections to be disposed on a ribbon-shaped film adhesive in such a way that the first and second sections alternate along the longitudinal axis of the ribbon-shaped film adhesive, such that two second sections are separated from one another by in each case one first section (and vice versa).

In one advantageous embodiment, in one of the first sections, the textile planar carrier material is materially modified such that the material of the carrier material in these regions is a material which on curing of the adhesive enters into a chemical reaction with the latter in order to bring about the desired mechanical feature in these first sections and carry out corresponding alteration in relation to the regions of the second sections.

This can be accomplished, for example, by the use in these first sections of a carrier-material material which on curing enters into a reaction with the embedded adhesive so as to bring about the correspondingly desired quality of the adhesive bond. In the production of the textile carrier material, for instance, it is conceivable to use fiber yarns or other linear structures to produce the textile carrier material that are of a material different from the rest of the material, this different material entering into a corresponding chemical reaction with the adhesive so as to achieve the quality.

In this context it is conceivable for, on the one hand, a high strength and stiffness to be established in the modified section, although this often entails a reduction in the elongation at break and fracture toughness (negative effect). These high-stiffness and high-strength sections then constitute the load-bearing regions. On the other hand, the elasticity and elongation at break are increased, which generally entails an increase in the fracture toughness and a reduction in the strength. However, the local reduction in the stiffness is rated positively in the present invention.

A critical pillar for the mode of functioning of the invention is the alternation of stiff and elastic regions. The stiff regions carry a major part of the load, while the elastic regions inhibit a developing crack after a maximum crack extension. Through their high elasticity and elongation at break, the elastic regions undergo greater deformation and are able therefore to transmit a major part of the load to the stiff regions lying behind them. At the same time, however, they provide relief to the stiff regions, since they already accommodate a part of the load themselves. Accordingly, the two different regions share the load and are able to bear it together, rather than failing when subjected to successive individual loading.

Through the modification of the carrier material, therefore, it is possible to exert a targeted influence on the qualities of the adhesive in the sense that either the stiffness and strength are specifically increased, and therefore load-bearing regions are formed, or the elasticity is specifically increased and therefore the crack-stopping regions are formed.

It is, however, also possible to conceive that in one of the first sections, the textile planar carrier material is chemically modified such that in this region or these regions, the carrier material is admixed with additional substances, particles and/or fillers, which on curing of the adhesive enter into a chemical reaction with the latter in order to bring about the desired mechanical feature in the first sections. It is conceivable, for example, for the carrier material to be admixed with additional substances by coating the carrier material with these substances in the first sections, in which case these substances, on curing of the adhesive, alter the adhesive accordingly such that it receives a higher or lower elongation at break, respectively, than in the remaining sections of the film adhesive. Also conceivable, however, is that the spacer textile is provided locally with adhering foreign bodies, which during the operation of curing the adhesive are embedded into the bondline, because of the reduced viscosity of the adhesive, and so bring about the modification. Another possible concept is the local coating of the textile carrier material with a polymer of relatively low stiffness, which during the curing of the adhesive film enters into a bond with the surrounding adhesive and so brings about the local change in quality.

In another advantageous embodiment it is conceivable that in one of the first sections, the textile planar carrier material is geometrically modified such that in these regions the material of the carrier material is a material which after the curing of the adhesive produces a higher or lower thickness of the adhesive bond than in the regions of the second sections. It has been recognized accordingly that through varying the thickness of the adhesive film it is also possible to alter the qualities in terms of the elongation at break or fracture toughness, so that through a geometric modification of the carrier material it is in fact also possible to achieve a modification of the elongation at break or fracture toughness.

Increasing the thickness of the adhesive film results, for example, in no change to the adhesive quality per se. However, since shear moduli and elasticity moduli of the adherends in customary adhesive bonds are much higher than those of the adhesive, an increase in the thickness of the adhesive layer leads to a reduction in the stiffness of the bond, and so, consequently, there is an increase, for example, in the elongation at break or fracture toughness, and this first region therefore, through thickening of the layer of adhesive, acquires a crack-stopping or crack-inhibiting quality.

The object is also achieved in accordance with the invention by the method as claimed in claim 9 for producing a film adhesive of this kind, where a provided adhesive is applied in the manner of a film to a provided planar textile carrier material, so that the textile planar carrier material is wetted on both sides with the adhesive. Here as well, the adhesive serves to produce the adhesive bond, without the textile planar carrier material becoming an adherend.

In this case, in accordance with the invention, the textile planar carrier material in at least one first section relative to at least one second section is modified materially, chemically and/or geometrically in such a way that no later than after the curing of the adhesive, the adhesive bond in the region of the first section has a mechanical feature, in relation to the elongation at break or fracture toughness, which is different from the mechanical feature of the adhesive bond in the region of the second section.

Here as well, the substantive, chemical and/or geometric modification of the carrier material means that on interaction with the adhesive, the quality of the adhesive is altered accordingly, so as to obtain an altered quality, in respect of the elongation at break or fracture toughness, relative to other regions.

Advantageous embodiments of this method are found in the corresponding dependent claims.

The object is also achieved with the method as claimed in claim 16 for producing an adhesive bond between at least two adherends, where first a film adhesive as described above is provided. The adhesive of the film adhesive is then contacted with the respective joining surface of the adherends, and the curing of the adhesive then produces an adhesive bond between the adherends, by means of the cured adhesive.

The adherends in this case may be fiber composite components produced from a fiber composite. The film adhesive may advantageously comprise a fiber material as planar textile carrier material, in which case the adhesive of the film adhesive may then, for example, be a matrix material of a fiber composite.

Figure 2:
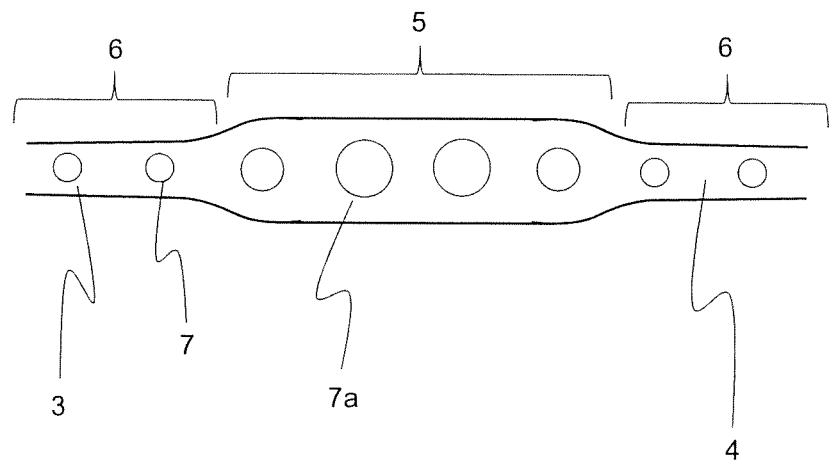
Figure 3:
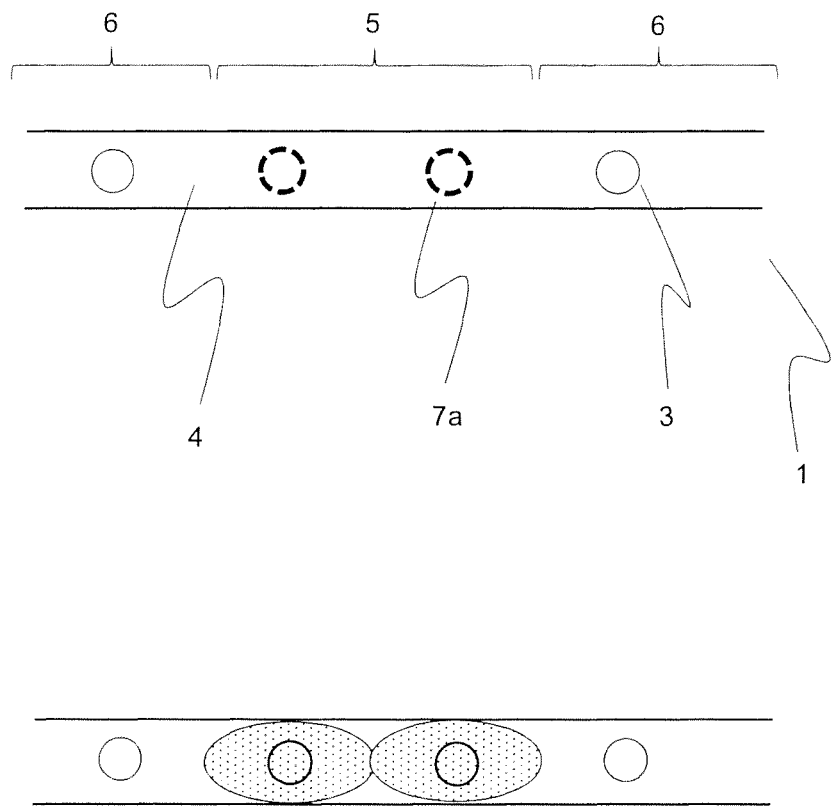
Figure 4:
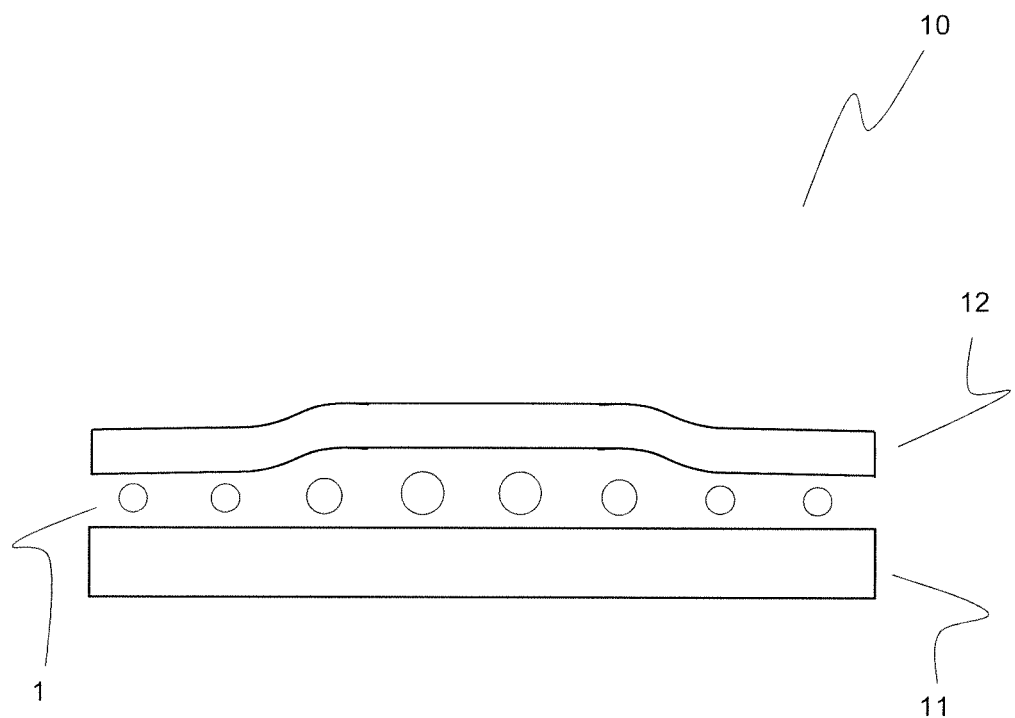

The invention is elucidated in more detail by way of example with reference to the appended figures, wherein:

FIG. 1—shows a schematic representation of a film adhesive;

FIG. 2—shows a schematic representation of a film adhesive in cross section;

FIG. 3—shows a schematic representation of one embodiment of the film adhesive;

FIG. 4—shows a schematic representation of a joining method.

FIG. 1 shows, schematically, a film adhesive 1 wound on a roll 2. The film adhesive 1 has a textile carrier material 3 which is embedded in an adhesive 4.

The textile planar carrier material 3 here preferably has dimensions which correspond to the length and the width of the film adhesive 1. The textile planar carrier material 3 here may preferably be composed on the basis of linear structures to form a planar structure, as is the case for woven textiles, for example. The textile carrier material 3 is preferably a flexurally slack material. Depending on the specific application, however, the carrier material may also be flexurally rigid.

The adhesive 4 here is applied to the carrier material 3 in such a way that the carrier material 3 is preferably covered completely by the adhesive on both flat sides. The carrier material 3 here is of a design such that it has greater or lesser open porosity, with the consequence that, after the curing of the adhesive 3, the adhesive bond via the adhesive material produces an operative bond from one flat side of the carrier material to the other flat side of the carrier material. As a result, ultimately, the carrier material 3 does not become an adherend in the adhesive bond, as is the case with a double-sided adhesive tape, for example.

The carrier material 3 here is modified in sections so as to form first sections 5 within which the carrier material 3 is materially, chemically and/or geometrically modified, while these first sections 5 are followed in each case by second sections 6 in which the carrier material 3 is not modified. The modification of the carrier material 3 in the first sections 5 results in an interaction with the adhesive 4, thereby altering qualities in terms of the elongation at break and/or fracture toughness of the adhesive 4 in the regions of the first sections 5 relative to the regions of the second sections 6, in order thus to achieve an adhesive bond which is heterogeneous in terms of the elongation at break or fracture toughness.

If the adhesive bond in the cured state exhibits a heterogeneity in relation to the elongation at break or fracture toughness, then regions with high elongation at break and relatively low stiffness/strength alternate with regions having low elongation at break and high stiffness/strength, meaning that cracks which form within the adhesive bond can only ever propagate as far as the next section.

To allow the film adhesive 1 to be wound onto the roll 2, the two flat sides of the film adhesive 1 are lined with a release foil, and so the individual flat sides do not stick to one another.

FIG. 2 shows a cross section A-A (see FIG. 1) through a part of the film adhesive 1, the first sections 5 being modified geometrically in this case. The modified regions shown in FIG. 2 (and in the subsequent figures) are not proportional to the remaining, unmodified regions 6. In practice, large regions of high stiffness and strength would be produced, surrounded by small regions of high elongation at break and fracture toughness. In this respect, therefore, the embodiments shown in the figures are not to scale.

The planar carrier material 3 in this case is a woven textile having individual fibers which may extend along and across the film adhesive 1. In the first section 5 of the film adhesive, the fibers 7a lying in this region are thicker (larger cross section than fibers in the second section 6), with the overall consequence here of a thickening of the film adhesive in the first region 5. As a result of the variation in the thickness of the adhesive film over the entire length of the film adhesive, it is possible to influence the bonding quality of the adhesive bond, since the thickness of adhesive film affects the bonding quality. This increase in the thickness of the adhesive film leads to a reduction in the stiffness of the bond, thereby increasing the elongation at break of the bond in the first section 5. As a result of the reinforcement or thickening of the carrier material in the first section 5, it is possible accordingly to bring about a geometric modification of the carrier material, which then leads to the desired change in quality of the adhesive bond. In this case it is the adhesive layer/bondline that is modified.

FIG. 3 shows, schematically, a cross section through a film adhesive 1, wherein the carrier material 3 has been modified chemically and/or materially in the first section 5 in such a way that on curing of the adhesive 4, it interacts with the chemical and/or substantive modification in the first section 5 in such a way that in this region the mechanical feature of the adhesive bond has been altered relative to the regions of the second sections 6.

In the case of a substantive modification, the material of the textile carrier material 3—hence the fibers 7a in the exemplary embodiment as in FIG. 3—is replaced by fibers having a corresponding modification. A modification of this kind of the fibers 7a may be of the form, for example, of use of fibers comprising a chemical substance reacting with the adhesive in the course of curing.

Also conceivable, however, is for the carrier material 3 to have fibers which are the same in all regions and sections, with the fibers of the carrier material 3 in the first sections 5 bearing corresponding applied substances which then react with the adhesive. Such substances may be applied, for example, in the form of powders or gels, and are present only in these first sections 5 of the carrier material 3.

The result of this is a local alteration in quality of the adhesive bond in the first sections 5, without the need to employ a plurality of adhesive systems of different kinds.

Also conceivable is the arrangement on the fibers of additional particles or extraneous substances which attach to the fibers 7a in the first section 5 of the carrier material and interact with the adhesive 4 on curing so that on the basis of a chemical reaction, for example, the adhesive bond in the first section 5 has mechanical qualities, in terms of elongation at break or fracture toughness, that are altered relative to the other sections.

The bottom part of FIG. 3 shows the cured adhesive bond, where in the first section 5 of the carrier material, on the basis of the chemical reaction of the adhesive 4 on curing, with the substantive and/or chemical modification, an altered mechanical feature has developed which in particular forms around the fibers 7a in the first section 5.

If it is assumed, for example, that the effect of the modification is to increase the elongation at break or fracture toughness, then cracks on loading of the adhesive bond develop first in general in the second sections 6 of the adhesive bond, and cracks formed there are then ultimately able to propagate only up to an adjoining region of a first section 5, since in that case the first sections 5 have an increased fracture toughness or elongation at break and cracks then no longer propagate along through this section.

FIG. 4 shows, schematically, the adhesive bonding of two adherends 11 and 12 by means of a film adhesive 1 of this kind, to produce a component 10. The component 10 may be, for example, a fiber composite component, which is to be joined substance-to-substance by means of the film adhesive 1 from two fiber composite structural elements.

In the exemplary embodiment of FIG. 4, the film adhesive 1 has a geometric modification in the first section 5, and so in the first section 5 of the film adhesive 1 the thickness of the adhesive film is increased, thereby producing a higher fracture toughness or elongation at break in this region than in the other sections 6.

If the component 10 is a fiber composite component, then the first structural element 11 and the second structural element 12 (first adherend 11, second adherend 12) have been or are likewise produced from a fiber composite. In the exemplary embodiment of FIG. 4, then, the first adherend 11 may already be a cured fiber composite structural element, wherein the matrix material infused the fiber material has already cured. The film adhesive 1 is then placed flatly and in a planar manner onto the joining surface of the first adherend 11, so that the adhesive 4 of the film adhesive 1 makes contact with the joining surface of the first adherend 11. Subsequently, the as yet uncured fiber composite structural element 12 (second adherend) is placed onto the film adhesive 1; here, the fiber material must be draped on the film adhesive 1 in such a way as to also take account of the geometric modification in the first section 15 of the film adhesive 1. In other words, the deviation in shape caused by the film adhesive 1, as a result of the geometric modification, must be compensated in shape terms by the second adherend in the exemplary embodiment of FIG. 4.

In the exemplary embodiment of FIG. 4, the design of the film adhesive 1 is such that the geometric modification in the first section 5 relates to only one side or one bond area, with the consequence here that, because of the geometric modification, only one of the adherends—in the exemplary embodiment of FIG. 4, the second adherend 12—has to be adapted in shape to the deviation in shape. Also conceivable, however, is for the film adhesive 1 to have a geometric modification in which both bond areas have a corresponding deviation in shape, requiring both adherends to be adapted to this deviation in shape. In such a case it is conceivable for the first adherend 11 not to be a cured adherend, in order to be able to compensate the corresponding deviation in shape. It is, however, also conceivable for the adherends 11 and 12 to be provided in such a way that they have already impressed the geometric modification of the film adhesive 1 and so are able to accommodate the geometric modification.

Especially in the case of the joining of ductile adherends (e.g., aluminum plates), the adherend may conform to the spacer textile during consolidation of the adhesive bond under autoclave pressure or in a press. Also conceivable, however, would be the joining of thermoplastic fiber composite components, which become plastic optionally at elevated temperature and are able accordingly to conform to the adhesive film.

As carrier material or spacer textile it is possible in this case to use textiles of any kind, such as nonwoven, woven fabrics, meshes, yarns, etc. A substantive, chemical and/or geometric modification may be accomplished, for example, by the introduction of additional carrier material in the form of textiles, nonwovens, woven fabrics, meshes or yarns, with corresponding chemical modification, for example. An alternative possibility is to use powders, particles or fillers which attach on the carrier material by fusion or by an adhesion promoter, for example. Suspensions are conceivable as well. Furthermore, a chemical and/or substantive modification even by means of substances in paste form or as an impregnation, by application at elevated temperature with subsequent solidification, for example, may be used.

Examples of substances for modification in order to provide corresponding modification of an epoxy resin, for example, are copolyamides, copolyesters, polyetherimide, polysulfone, polyphenylsulfone, polyethersulfone. These thermoplastics possess advantageous mechanical properties and with epoxy resins they can form mixed phases, and may be processed as a textile, as a powder or in paste form. Rubbers with hydroxyl groups on the free ends of the molecules (HTPB or CTBN, ATBN) are able to dissolve in epoxy and in the curing reaction they separate out as beads, owing to disappearing solubility. These materials are known for use as impact modifiers for epoxy resins. Application to the carrier may take place via all stated forms. Phenoxy (polyhydroxyether or bisphenol A epichlorohydrin having free OH end groups) is a thermoplastic which possesses solubility in epoxy and can be installed into the three-dimensional network structure of the thermoset. It may be applied as a textile, powder, or in paste form.

The invention claimed is:

1. A film adhesive for adhesively joining at least two adherends, comprising:
    an adhesive for an adhesive bond of the adherends,
    a textile planar carrier material bearing the adhesive, wherein the adhesive is applied to the textile planar carrier material as a film,
    wherein the textile planar carrier material has at least one first section which adjoins at least one second section, the first section being modified materially, chemically and/or geometrically relative to the second section such that after the curing of the adhesive, the adhesive bond has a mechanical feature selected from the group consisting of elongation at break and fracture toughness which is different in the first and second sections, wherein the textile planar carrier material is open-pored, so that the adhesive bond is realized exclusively by the adhesive and the carrier material does not become a joining partner.

2. The film adhesive as claimed in claim 1, wherein the textile planar carrier material of the first section is modified relative to the textile planar carrier material of the second section such that the adhesive bond in a region of the first section has a higher elongation at break or a higher fracture toughness than the adhesive bond in a region of the second section or such that the adhesive bond in the region of the first section has a lower elongation at break or a lower fracture toughness than the adhesive bond in the region of the second section.

3. The film adhesive as claimed in claim 2, wherein the fracture toughness or elongation at break is higher or lower by at least 20%.

4. The film adhesive as claimed in claim 1 wherein the textile planar carrier material has a plurality of first and second sections, wherein each first section is delimited from other first sections by one of the second sections so that the first sections each form separate zones which are not joined to one another.

5. The film adhesive as claimed in claim 1 wherein in the at least one first section the textile planar carrier material is materially modified such that the material of the textile planar carrier material on curing of the adhesive enters into a chemical reaction with the adhesive in order to bring about the mechanical feature in the at least one first section.

6. The film adhesive as claimed in claim 1 wherein in the at least one first section the textile planar carrier material is chemically modified by admixing with additional substances, particles and/or fillers, which on curing of the adhesive enter into a chemical reaction with the adhesive in order to bring about the mechanical feature in the at least one first section.

7. The film adhesive as claimed in claim 1 wherein in the at least one first section the textile planar carrier material is geometrically modified such that the curing of the adhesive produces a higher or lower thickness of the adhesive bond than in the at least one second section.

8. The film adhesive as claimed in claim 1 wherein the adhesive is ribbon-shaped and wherein the at least one first section and the at least one second section alternate in a longitudinal direction.

* * * * *